US012764189B2

(12) United States Patent
Wang

(10) Patent No.: US 12,764,189 B2
(45) Date of Patent: Oct. 13, 2026

(54) STORAGE DATA PROCESSING IN A STORAGE TOPOLOGY THAT INCLUDES A SERVER-TO-STORAGE CASCADE, A SERVER-TO-SWITCH-TO-STORAGE CASCADE AND A SERVER-TO-DIRECT JBOD CASCADE

(71) Applicant: SUZHOU METABRAIN INTELLIGENT TECHNOLOGY CO., LTD., Suzhou (CN)

(72) Inventor: Lupan Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 22 days.

(21) Appl. No.: 19/112,752

(22) PCT Filed: Sep. 27, 2023

(86) PCT No.: PCT/CN2023/122239

§ 371 (c)(1),
(2) Date: Mar. 18, 2025

(87) PCT Pub. No.: WO2024/148871

PCT Pub. Date: Jul. 18, 2024

(65) Prior Publication Data

US 2026/0100984 A1 Apr. 9, 2026

(30) Foreign Application Priority Data

Jan. 10, 2023 (CN) ......................... 202310036360.6

(51) Int. Cl.
*H04L 67/1097* (2022.01)
*H04L 61/50* (2022.01)

(52) U.S. Cl.
CPC .......... *H04L 67/1097* (2013.01); *H04L 61/50* (2022.05)

(58) Field of Classification Search
CPC ............................ H04L 67/1097; H04L 61/50
See application file for complete search history.

(56) References Cited

U.S. PATENT DOCUMENTS

2005/0049884 A1* 3/2005 Hunt ..................... G06F 3/0644 718/104
2011/0265083 A1 10/2011 Davis
(Continued)

FOREIGN PATENT DOCUMENTS

CN 106843765 A 6/2017
CN 109104319 A 12/2018
(Continued)

*Primary Examiner* — Hee Soo Kim
(74) *Attorney, Agent, or Firm* — IPro, PLLC

(57) ABSTRACT

The present disclosure provides a method for processing stored data. The method includes: obtaining service data, where the service data includes a service scenario and a total transmission amount; determining a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade; detecting a real-time transmission rate of the storage topology; dividing the total transmission amount into a first transmission amount, a second transmission amount and a third transmission amount based on the real-time transmission rate; and storing the first transmission amount based on the first storage sub-address, storing the second transmission amount based on the second storage sub-address, and storing the third transmission amount based on the third storage sub-address.

20 Claims, 8 Drawing Sheets

(56) References Cited

U.S. PATENT DOCUMENTS

| | | | | |
|---|---|---|---|---|
| 2018/0121102 | A1 | 5/2018 | Paulzagade et al. | |
| 2020/0028800 | A1* | 1/2020 | Strathman | H04L 45/245 |
| 2020/0145478 | A1* | 5/2020 | Gao | H04L 47/122 |
| 2021/0368575 | A1 | 11/2021 | Gao | |

FOREIGN PATENT DOCUMENTS

| | | | |
|---|---|---|---|
| CN | 109324897 | A | 2/2019 |
| CN | 110913504 | A | 3/2020 |
| CN | 111261227 | A | 6/2020 |
| CN | 113535471 | A | 10/2021 |
| CN | 114356243 | A | 4/2022 |
| CN | 115914140 | A | 4/2023 |
| JP | 2008072190 | A | 3/2008 |
| KR | 20150145049 | A | 12/2015 |

* cited by examiner

STORAGE DATA PROCESSING IN A STORAGE TOPOLOGY THAT INCLUDES A SERVER-TO-STORAGE CASCADE, A SERVER-TO-SWITCH-TO-STORAGE CASCADE AND A SERVER-TO-DIRECT JBOD CASCADE

CROSS-REFERENCE TO RELATED APPLICATION

The present disclosure claims the priority of Chinese patent application filed on Jan. 10, 2023 before the CNIPA, China National Intellectual Property Administration with the application number of 202310036360.6, and the title of "STORED DATA PROCESSING METHOD AND APPARATUS, ELECTRONIC DEVICE AND STORAGE MEDIUM", which is incorporated herein in its entirety by reference.

FIELD

The present disclosure relates to the field of data storage and transmission technologies, and more particularly to a method for processing stored data, an apparatus for processing stored data, an electronic device and a non-transitory storage medium.

BACKGROUND

In the era of big data, higher requirements are put forward for the reliability and efficiency of a storage array, especially for the stability and reliability of data backup and the efficiency of data transmission of a storage system. In current storage devices, with the application of a peripheral component interconnect express (PCIE) 5.0 high-speed transmission link, the data transmission rate has increased to 32 GB/S (gigabits per second) for a single lane. The fiber transmission rate of a fibre channel (FC) card used from a server to a switch and then to a storage end has reached 64 GB/S, and the network transmission protocol rate of a 10 gigabit network card used from the server to the storage end can reach 100 GB/S. However, the transmission rate of serial attached SCSI (SAS) cables on a just a bunch of disks (JBOD) unit commonly used in the storage devices is only 12 GB/S, and the transmission bandwidth of an external hard disk drive (HDD) is only a few hundred megabytes. This difference in frontend and backend transmission rates causes a certain delay in the process of uploading data from the server to a storage controller and writing the data to the storage controller, thereby bringing users a delayed experience when accessing the Internet. With the explosive growth of the current data volume, application scenarios of data have also become diverse, for example, financial system data, medical system data. Internet big data, and the like. The reliability requirements of various service scenarios for data storage and own characteristics of various data are different. In order to better cope with various data service scenarios, on a management software level, current storage products provide algorithms such as quality of service (QOS) resource restriction and automatic tiering to provide different services according to the importance level of the data; and on a hardware level, data transmission and processing are perform uniformly in various service scenarios, and services of different data types directly occupy IO resources indiscriminately on a storage level, which will affect the work efficiency of data storage and delay the processing of high-level core services. With the growth of massive data, the impact of above two problems will gradually become obvious.

SUMMARY

In view of the above problems, embodiments of the present disclosure are proposed to provide a method for processing stored data, an apparatus for processing stored data, an electronic device and a non-transitory storage medium that overcome or at least partially solve the above problems.

In a first aspect of the present disclosure, an embodiment of the present disclosure discloses a method for processing stored data, the stored data being transmitted in a storage topology, where the storage topology includes a server-to-storage cascade, a server-to-switch-to-storage cascade and a server-to-direct just a bunch of disks cascade, and the method includes:

- obtaining service data, where the service data includes a service scenario and a total transmission amount;
- determining a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade;
- detecting a real-time transmission rate of the storage topology;
- dividing the total transmission amount into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade; and
- storing the first transmission amount based on the first storage sub-address, storing the second transmission amount based on the second storage sub-address, and storing the third transmission amount based on the third storage sub-address.

In an embodiment of the present disclosure, after the step of storing the first transmission amount based on the first storage sub-address, storing the second transmission amount based on the second storage sub-address, and storing the third transmission amount based on the third storage sub-address, the method further includes:

- recording a first storage state of the server-to-storage cascade, a second storage state of the server-to-switch-to-storage cascade and a third storage state of the server-to-direct just a bunch of disks cascade; and
- adjusting a storage interval of the server-to-storage cascade based on the first storage state, adjusting a storage interval of the server-to-switch-to-storage cascade based on the second storage state, and adjusting a storage interval of the server-to-direct just a bunch of disks cascade based on the third storage state.

In an embodiment of the present disclosure, after the step of storing the first transmission amount based on the first storage sub-address, storing the second transmission amount based on the second storage sub-address, and storing the third transmission amount based on the third storage sub-address, the method further includes:

determining whether the service scenario is a target scenario; and verifying data stored in the server-to-direct just a bunch of disks cascade in response to the service scenario being the target scenario.

In an embodiment of the present disclosure, after the step of verifying the data stored in the server-to-direct just a bunch of disks cascade, the method further includes:

performing data recovery on the server-to-direct just a bunch of disks cascade in response to a failure of the verifying the data stored in the server-to-direct just a bunch of disks cascade.

In an embodiment of the present disclosure, the method further includes:

detecting a first link state of the server-to-storage cascade, a second link state of the server-to-switch-to-storage cascade and a third link state of the server-to-direct just a bunch of disks cascade during initialization; and performing the step of detecting the real-time transmission rate of the storage topology in response to the first link state being a normal state, the second link state being a normal state and the third link state being a normal state.

In an embodiment of the present disclosure, after the step of storing the first transmission amount based on the first storage sub-address, storing the second transmission amount based on the second storage sub-address, and storing the third transmission amount based on the third storage sub-address, the method further includes:

detecting whether the first link state is the normal state, whether the second link state is the normal state and whether the third link state is the normal state;

determining a first failed disk corresponding to the server-to-storage cascade in response to the first link state being an abnormal state;

determining a second failed disk corresponding to the server-to-switch-to-storage cascade in response to the second link state being an abnormal state;

determining a third failed disk corresponding to server-to-direct just a bunch of disks cascade in response to the third link state being an abnormal state; and removing at least one of the first failed disk, the second failed disk or the third failed disk.

In an embodiment of the present disclosure, the real-time transmission rate includes a real-time input rate and a real-time output rate, and the step of dividing the total transmission amount into the first transmission amount, the second transmission amount and the third transmission amount based on the real-time transmission rate includes:

calculating a rate difference between the real-time input rate and the real-time output rate; and dividing the total transmission amount into the first transmission amount, the second transmission amount and the third transmission amount according to the rate difference.

In an embodiment of the present disclosure, the real-time input rate includes a first input rate corresponding to the server-to-storage cascade, a second input rate corresponding to the server-to-switch-to-storage cascade and a third input rate corresponding to the server-to-direct just a bunch of disks cascade, the real-time output rate includes a first output rate corresponding to the server-to-storage cascade, a second output rate corresponding to the server-to-switch-to-storage cascade and a third output rate corresponding to the server-to-direct just a bunch of disks cascade, and the step of calculating the rate difference between the real-time input rate and the real-time output rate includes:

calculating a first difference between the first input rate and the first output rate;

calculating a second difference between the second input rate and the second output rate;

calculating a third difference between the third input rate and the third output rate; and determining the rate difference according to the first difference, the second difference and the third difference.

In an embodiment of the present disclosure, the step of determining the rate difference according to the first difference, the second difference and the third difference includes:

sorting the first difference, the second difference and the third difference in increasing order to generate a set of differences; and determining a difference at a first position in the set of differences as the rate difference.

In an embodiment of the present disclosure, the step of dividing the total transmission amount into the first transmission amount, the second transmission amount and the third transmission amount according to the rate difference includes:

adjusting the first input rate and the first output rate according to the rate difference to obtain a first transmission sub-rate;

adjusting the second input rate and the second output rate according to the rate difference to obtain a second transmission sub-rate;

adjusting the third input rate and the third output rate according to the rate difference to obtain a third transmission sub-rate; and dividing the total transmission amount into the first transmission amount, the second transmission amount and the third transmission amount according to the first transmission sub-rate, the second transmission sub-rate and the third transmission sub-rate.

In an embodiment of the present disclosure, the step of dividing the total transmission amount into the first transmission amount, the second transmission amount and the third transmission amount according to the first transmission sub-rate, the second transmission sub-rate and the third transmission sub-rate includes:

dividing the total transmission amount by the first transmission sub-rate to obtain a first transmission amount;

dividing the total transmission amount by the second transmission sub-rate to obtain a second transmission amount; and dividing the total transmission amount by the third transmission sub-rate to obtain a third transmission amount.

In an embodiment of the present disclosure, the service scenario includes a service type and data heat, and the step of determining the storage path according to the service scenario includes:

performing path planning based on the service type to obtain a first initial path; performing path planning based on the data heat to obtain a second initial path; and generating the storage path by combining the first initial path and the second initial path.

In an embodiment of the present disclosure, the step of determining the storage path according to the service scenario further includes:

performing redundant settings on the storage path in response to the service type being a preset service type.

In an embodiment of the present disclosure, the step of performing the path planning based on the service type to obtain the first initial path includes:

determining a storage priority according to the service type; and performing the path planning based on the storage priority to obtain the first initial path.

In an embodiment of the present disclosure, the step of performing the path planning based on the storage priority to obtain the first initial path includes:

querying a disk path corresponding to the storage priority; and determining the disk path as the first initial path.

In an embodiment of the present disclosure, the step of performing the path planning based on the data heat to obtain the second initial path includes:

performing descending sorting according to the data heat to generate a heat order; and performing the path planning according to the heat order to obtain the second initial path.

In an embodiment of the present disclosure, the step of performing the path planning according to the heat order to obtain the second initial path includes:

determining a reading frequency path corresponding to the heat order; and determining the reading frequency path as the second initial path.

In a second aspect of the present disclosure, an embodiment of the present disclosure discloses a n apparatus for processing stored data, the stored data being transmitted in a storage topology, where the storage topology includes a server-to-storage cascade, a server-to-switch-to-storage cascade and a server-to-direct just a bunch of disks cascade, and the apparatus includes:

a first obtaining module configured to obtain service data, where the service data includes a service scenario and a total transmission amount;

a path allocation module configured to determine a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade;

a detection module configured to detect a real-time transmission rate of the storage topology;

a rate allocation module configured to divide the total transmission amount into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade; and a storage module configured to store the first transmission amount based on the first storage sub-address, store the second transmission amount based on the second storage sub-address, and store the third transmission amount based on the third storage sub-address.

In a third aspect of the present disclosure, an embodiment of the present disclosure further discloses an electronic device, including: a processor, a memory and a computer program stored in the memory and capable of running on the processor, where the computer program, when executed by the processor, cases the processor to implement the steps of the method for processing stored data described above.

In a fourth aspect of the present disclosure, an embodiment of the present disclosure further discloses a non-transitory readable storage medium storing a computer program, where the computer program, when executed by a processor, cases the processor to implement the steps of the method for processing stored data described above.

The embodiments of the present disclosure include following advantages.

In the embodiments of the present disclosure, by obtaining service data, where the service data includes a service scenario and a total transmission amount; determining a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade; detecting a real-time transmission rate of the storage topology; dividing the total transmission amount into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade; and storing the first transmission amount based on the first storage sub-address, storing the second transmission amount based on the second storage sub-address, and storing the third transmission amount based on the third storage sub-address. By setting corresponding hardware transmission resource allocation planning for three cascade structures in a manner of optimally solving, and allocating hardware resources of the storage device in the most balanced manner of the input rate and the output rate, it is ensured that the data is written from the server to the storage end without delay, thereby improving the storage efficiency. In addition, data storage planning is provided for different service scenarios, so that data analysis at the service level is performed first before data transmission, and storage planning of different service data is arranged according to the results, thereby ensuring the safety and reliability of data storage.

BRIEF DESCRIPTION OF THE DRAWINGS

In order to more clearly illustrate technical solutions in the embodiments of the present disclosure or in the related art, accompanying drawings to be used in the description of the embodiments or the related art will be briefly introduced below. Obviously, the accompanying drawings in the description below are only some embodiments of the present disclosure. For a person skilled in the art, other accompanying drawings may also be obtained according to the provided accompanying drawings without paying creative labor.

DETAILED DESCRIPTION

In order to make objects, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are merely a part of the embodiments of the present disclosure, rather than all of the embodiments. All of the other embodiments that a person skilled in the art obtains on the basis of the embodiments of the present disclosure without paying creative labor fall within the protection scope of the present disclosure.

Figure 1:
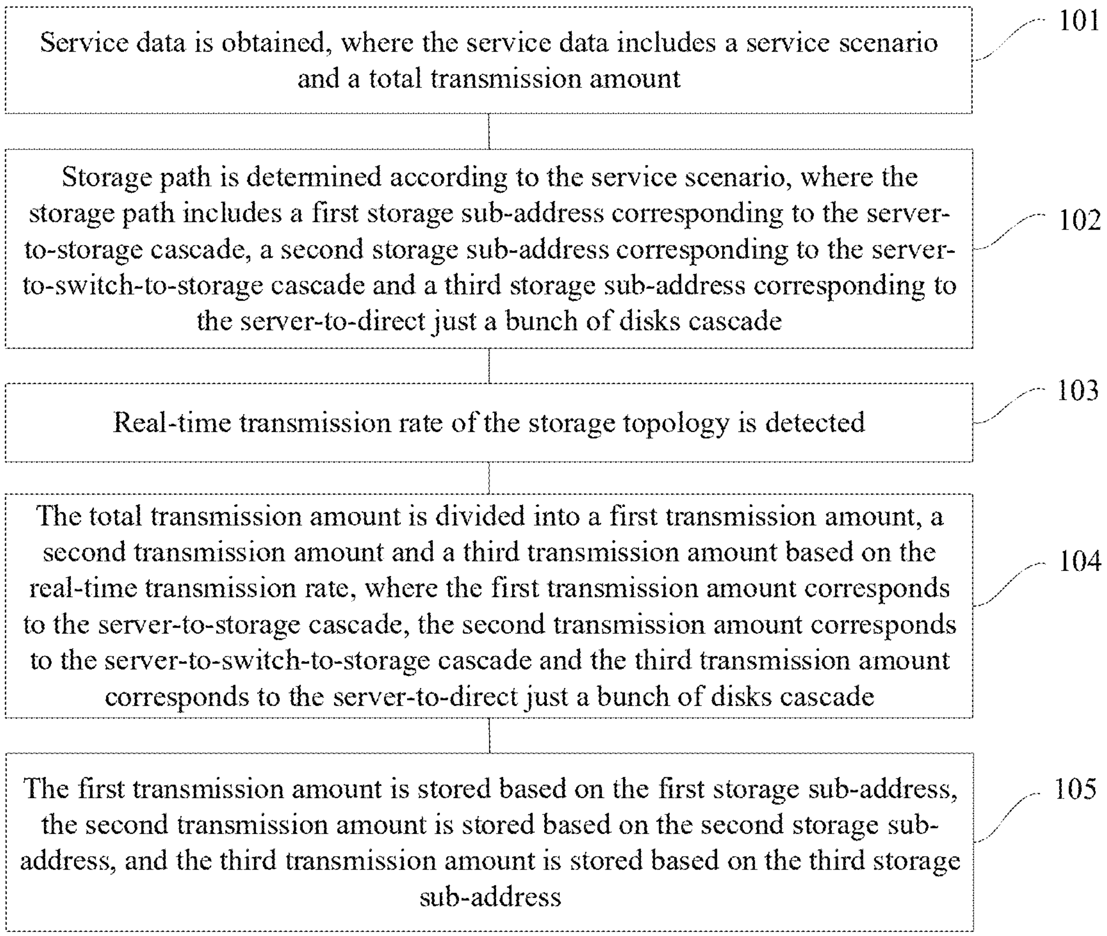
FIG. 1 is a flowchart of steps of a method for processing stored data according to an embodiment of the present disclosure.

Referring to FIG. 1, FIG. 1 shows a flowchart of steps of a method for processing stored data according to an embodiment of the present disclosure. The stored data is transmitted in a storage topology, and the storage topology includes a server-to-storage cascade, a server-to-switch-to-storage cascade and a server-to-direct just a bunch of disks cascade.

In the embodiment of the present disclosure, the stored data to be processed is transmitted in the storage topology, and the storage topology includes the server-to-storage cascade, the server-to-switch-to-storage cascade and the server-to-direct just a bunch of disks cascade. The server-to-storage cascade is a structure between a server frontend and a hard disk. The server-to-switch-to-storage cascade is a data transfer structure among the server frontend, a switch and a direct just a bunch of disks. The server-to-direct just a bunch of disks cascade is a data transfer structure between the server frontend and the direct just a bunch of disks. The method for processing stored data can include following steps.

Step 101, service data is obtained, where the service data includes a service scenario and a total transmission amount.

When a server needs to store data, the server can obtain the service data from one or more objects that generate the data. The service data includes a service scenario of the service data and a total transmission amount of the service data.

Step 102, a storage path is determined according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade.

Planning is performed on storage addresses in the service data according to the service scenario to determine the storage path, thereby ensuring that the service data of important service scenarios may be stored in a disk area that is not easily lost. Since the service data is transmitted in all three cascade structures, the storage path includes the first storage sub-address corresponding to the server-to-storage cascade, the second storage sub-address corresponding to the server-to-switch-to-storage cascade and the third storage sub-address corresponding to the server-to-direct just a bunch of disks cascade. The first storage sub-address is storage addresses in the server-to-storage cascade, the second storage sub-address is storage addresses in the server-to-switch-to-storage cascade, and the third storage sub-address is storage addresses in the server-to-direct just a bunch of disks cascade.

Step 103, a real-time transmission rate of the storage topology is detected.

Then the real-time transmission rate of each port in three storage topologies is detected, that is, the real-time transmission rate of each port in the server-to-storage cascade, the server-to-switch-to-storage cascade and the server-to-direct just a bunch of disks cascade.

Step 104, the total transmission amount is divided into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade.

The hardware usage of three cascades, namely, the server-to-storage cascade, the server-to-switch-to-storage cascade and the server-to-direct just a bunch of disks cascade, may be determined according to the real-time transmission rate, and then the total transmission amount can be divided into the first transmission amount, the second transmission amount and the third transmission amount, so that the transmission rates of the three cascades are close, thereby reducing the delay waiting time and improving the transmission efficiency. Herein, the first transmission amount corresponds to the server-to-storage cascade, the second transmission amount corresponds to the server-to-switch-to-storage cascade and the third transmission amount corresponds to the server-to-direct just a bunch of disks cascade.

Step 105, the first transmission amount is stored based on the first storage sub-address, the second transmission amount is stored based on the second storage sub-address, and the third transmission amount is stored based on the third storage sub-address.

Finally, data storage is performed on the three cascades, namely, namely, the server-to-storage cascade, the server-to-switch-to-storage cascade and the server-to-direct just a bunch of disks cascade. That is, in the server-to-storage cascade, the first transmission amount is stored based on the first storage sub-address; in the server-to-switch-to-storage cascade, the second transmission amount is stored based on the second storage sub-address, and in the server-to-direct just a bunch of disks cascade, the third transmission amount is stored based on the third storage sub-address.

In the embodiments of the present disclosure, by obtaining service data, where the service data includes a service scenario and a total transmission amount; determining a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade; detecting a real-time transmission rate of the storage topology; dividing the total transmission amount into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade; and storing the first transmission amount based on the first storage sub-address, storing the second transmission amount based on the second storage sub-address, and storing the third transmission amount based on the third storage sub-address. By setting corresponding hardware transmission resource allocation planning for three cascade structures in a manner of optimally solving, and allocating hardware resources of the storage device in the most balanced manner of the input rate and the output rate, it is ensured that the data is written from the server to the storage end without delay, thereby improving the storage efficiency. In addition, data storage planning is provided for different service scenarios, so that data analysis at the service level is performed first before data transmission, and storage planning of different service data is arranged according to the results, thereby ensuring the safety and reliability of data storage.

Figure 2:
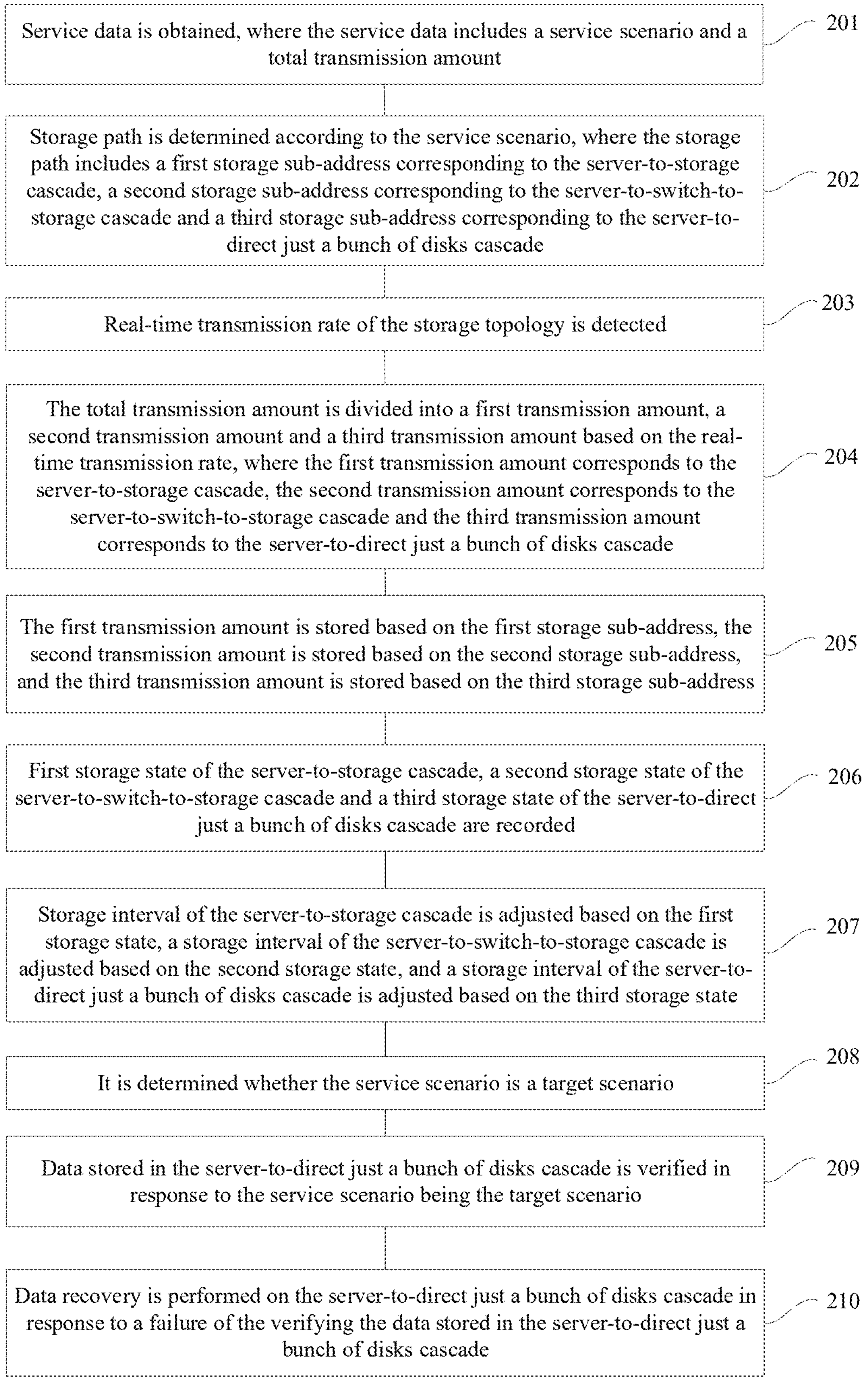
FIG. 2 is a flowchart of steps of another method for processing stored data according to an embodiment of the present disclosure.

Referring to FIG. 2, FIG. 2 shows a flowchart of steps of a method for processing stored data according to an embodiment of the present disclosure. The stored data is transmitted in a storage topology, and the storage topology includes a server-to-storage cascade, a server-to-switch-to-storage cascade and a server-to-direct just a bunch of disks cascade.

Step 201, service data is obtained, where the service data includes a service scenario and a total transmission amount.

In the embodiment of the present disclosure, when a server needs to store data, the server obtains the service data to be stored. The service data includes the service scenario and the total transmission amount.

Step 202, a storage path is determined according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade.

First, service importance is analyzed based on the service scenario. For example, the current service data includes three types of data such as financial data, hospital data and government affairs, and enjoys the highest priority, the stored data is marked as important service data when storing the above three types of data, and then path planning is performed according to the importance. Moreover, data heat is also analyzed based on the service scenario, where hot data and non-hot data are stored in different manners. The storage path is determined based on the service importance and the heat, where the storage path includes the first storage sub-address corresponding to the server-to-storage cascade, the second storage sub-address corresponding to the server-to-switch-to-storage cascade and the third storage sub-address corresponding to the server-to-direct just a bunch of disks cascade.

In an embodiment of the present disclosure, the service scenario includes a service type and data heat, and the step of determining the storage path according to the service scenario includes following substeps.

Substep S2021, path planning is performed based on the service type to obtain a first initial path.

First, a first round of path planning is performed based on the service type to obtain the first initial path.

The step of performing the path planning based on the service type to obtain the first initial path includes: determining a storage priority according to the service type; and performing the path planning based on the storage priority to obtain the first initial path.

The priority of data storage is determined according to the service type. The higher priority indicates that the data needs to be stored in an area that is not easily lost. The path planning is performed from the data with the highest priority to the data with the lowest priority to obtain the first initial path.

Further, the step of performing the path planning based on the storage priority to obtain the first initial path includes: querying a disk path corresponding to the storage priority; and determining the disk path as the first initial path.

First, a storage area of the disk corresponds to a storage address, which is the disk path, and thus an idle disk path corresponding to the storage priority can be queried, and then the idle disk path is determined as the first initial path.

Substep S2022, path planning is performed based on the data heat to obtain a second initial path.

Then, a second round of path planning is performed based on the data heat to obtain the second initial path.

The step of performing the path planning based on the data heat to obtain the second initial path includes: performing descending sorting according to the data heat to generate a heat order; and performing the path planning according to the heat order to obtain the second initial path.

The analysis can be performed according to a data hot degree. High hot data is data that has been read and written for many times, or also data that has been accessed by users for many times. The data is mainly related to the Internet and database. In the process of processing the data by a central processing unit (CPU), the server will feed back user access traffic to the storage in real time, meanwhile, reading and writing times of the data on the disk side will be recorded and fed back, and corresponding hot data will be extracted according to the above information. Moreover, data that is not the hot data in service data is the non-hot data.

The descending sorting can be performed according to the data hot degree to generate the heat order, that is, the higher the heat, the higher the order. The path planning is performed on the data according to the heat order to plan the data to the data disk corresponding to the heat, and the second initial path is obtained.

Further, the step of performing the path planning according to the heat order to obtain the second initial path includes: determining a reading frequency path corresponding to the heat order; and determining the reading frequency path as the second initial path.

A path of a disk with an idle reading frequency (that is, the reading frequency path) corresponding to the heat is determined according to the heat order, and then the reading frequency path is determined as the second initial path.

Substep S2023, the storage path is generated by combining the first initial path and the second initial path.

Further, the first initial path and the second initial path obtained based on the two rounds of path planning are combined to generate the storage path for each cascade.

In an embodiment of the present disclosure, the service scenario includes a service type and data heat, and the step of determining the storage path according to the service scenario further includes:

Substep S2024, redundant settings are performed on the storage path in response to the service type being a preset service type.

The preset service type can be a service type corresponding to a service with relatively high security requirements. When the service type is the preset service type, in order to ensure the security of the data, redundant settings are performed on the storage path, and the important service data is split and stored on a plurality of backend disks. When an abnormality occurs, data recovery can be performed based on residual data and verification information.

Step 203, a real-time transmission rate of the storage topology is detected.

During normal operation, a rate parameter of each port of the storage topology is detected to determine the real-time transmission rate. The real-time transmission rate includes the real-time transmission rate of each port in the server-to-storage cascade, the server-to-switch-to-storage cascade and the server-to-direct just a bunch of disks cascade.

Step 204, the total transmission amount is divided into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade.

The total transmission amount is divided into each cascade structure according to the real-time transmission rate, that is, the total transmission amount is divided into the first transmission amount, the second transmission amount and the third transmission amount. The first transmission amount corresponds to the server-to-storage cascade, the second transmission amount corresponds to the server-to-switch-to-storage cascade and the third transmission amount corresponds to the server-to-direct just a bunch of disks cascade. The transmission efficiency of each cascade structure is optimized, so as to improve the transmission efficiency.

In an embodiment of the present disclosure, the real-time transmission rate includes a real-time input rate and a real-time output rate, and the step of dividing the total transmission amount into the first transmission amount, the second transmission amount and the third transmission amount based on the real-time transmission rate includes following substeps.

Substep S2041, a rate difference between the real-time input rate and the real-time output rate is calculated.

The rate difference between the real-time input rate and the real-time output rate is calculated, and then an input situation and an output situation of each cascade structure are determined.

In an embodiment of the present disclosure, the real-time input rate includes a first input rate corresponding to the server-to-storage cascade, a second input rate corresponding to the server-to-switch-to-storage cascade and a third input rate corresponding to the server-to-direct just a bunch of disks cascade, the real-time output rate includes a first output rate corresponding to the server-to-storage cascade, a second output rate corresponding to the server-to-switch-to-storage cascade and a third output rate corresponding to the server-to-direct just a bunch of disks cascade, and the step of calculating the rate difference between the real-time input rate and the real-time output rate includes following substeps.

Substep S20411, a first difference between the first input rate and the first output rate is calculated.

A difference between the first input rate and the first output rate of the server-to-storage cascade can be calculated, which is the first difference.

Substep S20412, a second difference between the second input rate and the second output rate is calculated.

A difference between the second input rate and the second output rate of the server-to-switch-to-storage cascade can be calculated, which is the second difference.

Substep S20413, a third difference between the third input rate and the third output rate is calculated.

A difference between the third input rate and the third output rate of the server-to-direct just a bunch of disks cascade can be calculated, which is the third difference.

Substep S20414, the rate difference is determined according to the first difference, the second difference and the third difference.

Then, the rate difference for adjusting hardware resources is determined based on the first difference, the second difference and the third difference.

The step of determining the rate difference according to the first difference, the second difference and the third difference includes: sorting the first difference, the second difference and the third difference in increasing order to generate a set of differences; and determining a difference at a first position in the set of differences as the rate difference.

The set of differences can be generated according to the first difference, the second difference and the third difference in increasing order, that is, sorted from small to large, and then the difference at the first position in the set of differences can be determined as the rate difference, that is, the smallest difference is determined as the rate difference.

Substep S2042, the total transmission amount is divided into the first transmission amount, the second transmission amount and the third transmission amount according to the rate difference.

Then, the total transmission amount is divided into the first transmission amount, the second transmission amount and the third transmission amount according to the rate difference, so that the transmission delay of each cascade structure is the lowest.

According to the rate difference, the total transmission amount is divided into a first transmission amount, and the second transmission amount and the third transmission amount include following substeps.

Substep S20421, the first input rate and the first output rate are adjusted according to the rate difference to obtain a first transmission sub-rate.

First, the first input rate and the first output rate can be adjusted according to the rate difference, so that the first input rate and the first output rate are matched, and the first transmission sub-rate is obtained, thereby reducing the delay.

Substep S20422, the second input rate and the second output rate are adjusted according to the rate difference to obtain a second transmission sub-rate.

The second input rate and the second output rate are adjusted according to the rate difference, so that the second input rate and the second output rate are matched, and the second transmission sub-rate is obtained, thereby reducing the delay.

Substep S20423, the third input rate and the third output rate are adjusted according to the rate difference to obtain a third transmission sub-rate.

The third input rate and the third output rate are adjusted according to the rate difference, so that the third input rate and the third output rate are matched, and the third transmission sub-rate is obtained, thereby reducing the delay.

Substep S2044, the total transmission amount is divided into the first transmission amount, the second transmission amount and the third transmission amount according to the first transmission sub-rate, the second transmission sub-rate and the third transmission sub-rate.

Then, the total transmission amount is divided according to the first transmission sub-rate, the second transmission sub-rate and the third transmission sub-rate respectively to determine the corresponding first transmission amount, the second transmission amount and the third transmission amount.

The step of dividing the total transmission amount into the first transmission amount, the second transmission amount and the third transmission amount according to the first transmission sub-rate, the second transmission sub-rate and the third transmission sub-rate includes: dividing the total transmission amount by the first transmission sub-rate to obtain a first transmission amount; dividing the total transmission amount by the second transmission sub-rate to obtain a second transmission amount; and dividing the total transmission amount by the third transmission sub-rate to obtain a third transmission amount.

For the division of the total transmission amount, that is, the total transmission amount is divided by the first transmission sub-rate to obtain the first transmission amount, so that the server-to-storage cascade may transmit and store at the first transmission amount; the total transmission amount is divided by the second transmission sub-rate to obtain the second transmission amount, so that the server-to-switch-to-storage cascade may transmit and store at the second transmission amount; and the total transmission amount is divided by the third transmission sub-rate to obtain the third transmission amount, so that the server-to-direct just a bunch of disks cascade may transmit and store at the third transmission amount.

To sum up, the transmission amount is divided in a balanced manner, so that the rate may be optimized. That is:

$$\begin{cases} \text{Optimization objective: } \min F1+F2+F3 \\ F1=\sum_{i=1}^{n1} I(i)-\sum_{i=1}^{m1} O(i)+M(i) \\ F2=\sum_{i=1}^{n2} I(i)-\sum_{i=1}^{m2} O(i)+M(i) \\ F3=\sum_{i=1}^{n3} I(i)-\sum_{i=1}^{m3} O(i)+M(i) \\ \text{Constraint conditions: } n1+n2+n3+m1+m2+m3 \le HWtotal \\ I(i) \le I(i)spec \\ O(i) \le O(i)spec,\ M(i) \le M(i)spec \end{cases},$$

where F1, F2 and F3 represent differences between an input rate of data from the frontend with an output write-to-disk rate and a data processing rate of the data in a controller under three data transmission topologies; the optimization objective represents a minimum rate difference under the three topologies; n and m respectively represent a number of input links and a number of data processing units and data output links, which are constrained by hardware resources of the whole storage system; I represents an input rate of a data input unit, O represents an output rate of a data output unit, and M represents a processing rate of a data processing unit, which is limited by the constraint of the highest rate in the specification.

Step 205, the first transmission amount is stored based on the first storage sub-address, the second transmission amount is stored based on the second storage sub-address, and the third transmission amount is stored based on the third storage sub-address.

The first transmission amount is stored in the first storage sub-address, the second transmission amount is stored in the second storage sub-address, and the third transmission amount is stored in the third storage sub-address, so as to complete the data storage of each cascade structure.

Step 206, a first storage state of the server-to-storage cascade, a second storage state of the server-to-switch-to-storage cascade and a third storage state of the server-to-direct just a bunch of disks cascade are recorded.

After the data is written to the storage, the storage state of each cascade structure is recorded, that is, the first storage state of the server-to-storage cascade, the second storage state of the server-to-switch-to-storage cascade and the third storage state of the server-to-direct just a bunch of disks cascade are recorded.

Step 207, a storage interval of the server-to-storage cascade is adjusted based on the first storage state, a storage interval of the server-to-switch-to-storage cascade is adjusted based on the second storage state, and a storage interval of the server-to-direct just a bunch of disks cascade is adjusted based on the third storage state.

The storage interval of each cascade is updated in real time according to the storage situation of the service data, and a storage space with a large space remaining amount is allocated to a storage space with a small space remaining amount for the next round of data storage. The storage interval of the server-to-storage cascade can be adjusted based on the first storage state, the storage interval of the server-to-switch-to-storage cascade can be adjusted based on the second storage state, and the storage interval of the server-to-direct just a bunch of disks cascade can be adjusted based on the third storage state.

Step 208, it is determined whether the service scenario is a target scenario.

In the embodiment of the present disclosure, it is possible to determine whether the service scenario is the target scenario, and when the service scenario is the target scenario, the data can be verified to ensure the security of the data.

Step 209, data stored in the server-to-direct just a bunch of disks cascade is verified in response to the service scenario being the target scenario.

When the service scenario is the target scenario, the data stored in the server-to-direct just a bunch of disks cascade is verified. The verification method can be redundant array of independent disks 5 (RAID5, a name of the verification method) verification.

Step 210, data recovery is performed on the server-to-direct just a bunch of disks cascade in response to a failure of the verifying the data stored in the server-to-direct just a bunch of disks cascade.

When the verification fails, it means that there is data loss. At this time, it is necessary to recover the data in the cascade structure at a last stage, that is, data recovery is performed on the server-to-direct just a bunch of disks cascade, so as to recover all the data, thereby reducing the data loss.

In an embodiment of the present disclosure, in a scenario such as first boot/device upgrade/restart/machine cluster reorganization, that is, a first link state of the server-to-storage cascade, a second link state of the server-to-switch-to-storage cascade and a third link state of the server-to-direct just a bunch of disks cascade can also be detected during initialization.

When the first link state is a normal state, the second link state is a normal state and the third link state is a normal state, the step of detecting the real-time transmission rate of the storage topology is performed.

During initialization, the first link state of the server-to-storage cascade, the second link state of the server-to-switch-to-storage cascade and the third link state of the server-to-direct just a bunch of disks cascade are detected, that is, the transmission state of each cascade structure is detected to determine whether data transmission and storage can be performed. When the first link state is the normal state, the second link state is the normal state and the third link state is the normal state, it means that the transmission state of each cascade structure is normal, and the step of detecting the real-time transmission rate of the storage topology can be performed for data transmission and storage.

When the first link state is an abnormal state, or the second link state is an abnormal state, or the third link state is an abnormal state, it means that the transmission state of each cascade structure is faulty and needs to be repaired.

It is detected whether the first link state is the normal state, whether the second link state is the normal state and whether the third link state is the normal state; when the first link state is the abnormal state, a first failed disk corresponding to the server-to-storage cascade is determined; when the second link state is the abnormal state, a second failed disk corresponding to the server-to-switch-to-storage cascade is determined; when the third link state is the abnormal state, a third failed disk corresponding to server-to-direct just a bunch of disks cascade is determined; at least one of the first failed disk, the second failed disk or the third failed disk is removed.

It is detected whether the first link state is the normal state, whether the second link state is the normal state and whether the third link state is the normal state; when the first link state is the abnormal state, that is, there is a fault in the server-to-storage cascade, the first failed disk corresponding to the server-to-storage cascade is determined; when the second link state is the abnormal state, that is, there is a fault in the server-to-switch-to-storage cascade, the second failed disk corresponding to the server-to-switch-to-storage cascade is determined; when the third link state is the abnormal state, that is, there is a fault in the server-to-direct just a bunch of disks cascade, third failed disk corresponding to server-to-direct just a bunch of disks cascade is determined; and then, at least one of the first failed disk, the second failed disk or the third failed disk is removed.

In the embodiment of the present disclosure, by allocating hardware resources of the storage device in the most balanced manner of the input rate and the output rate, it is ensured that the data is written from the server to the storage end without delay, thereby improving the storage efficiency. By cooperating with algorithms of data storage path planning according to the service scenario, the service is analyzed according to service levels and data usage hots, which specially face the current huge and complex data storage service scenario, and various data transmission planning is given based on this, thereby improving the flexibility of the storage system. By arranging the most reliable planning path for important data, and switching the data storage planning in real time according to the access traffic, the reliability of data storage is improved; and on the basis of keeping the capacity of the storage system unchanged, the disk performance is further developed. In addition, based on data reading and writing records and the capacity adjustment according to the service situation before data transmission, it is ensured that the data is written to the storage without delay, and thus disk partitions may be flexibly arranged for complex service scenarios.

In order to make a person skilled in the art better understand the embodiment of the present disclosure, the embodiment of the present disclosure will be explained through an example.

Figure 3:
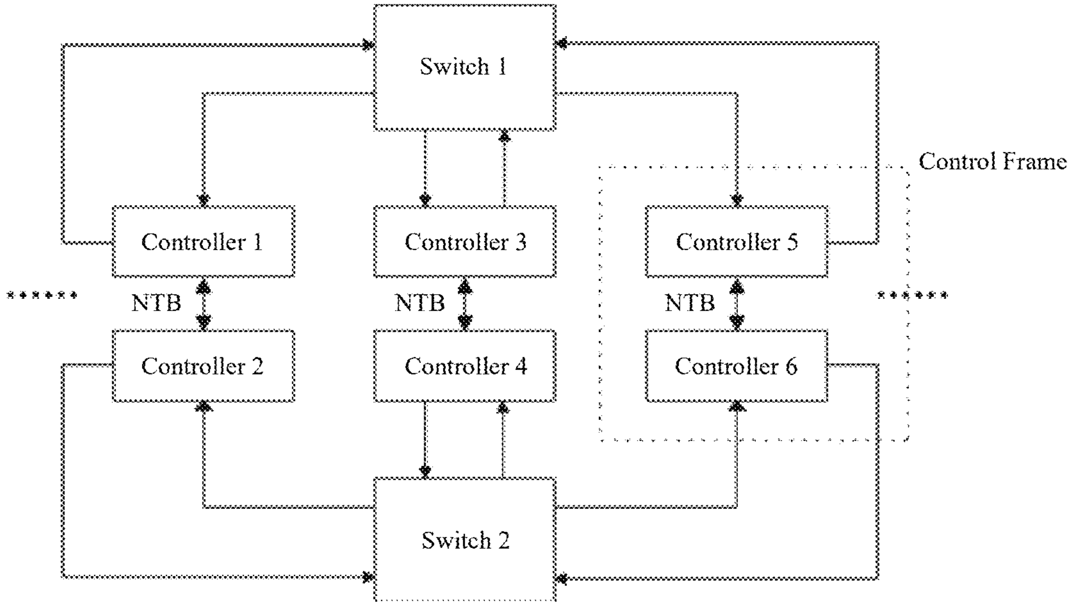
FIG. 3 is a schematic diagram of a hardware connection of a method for processing stored data according to an embodiment of the present disclosure.
Figure 4:
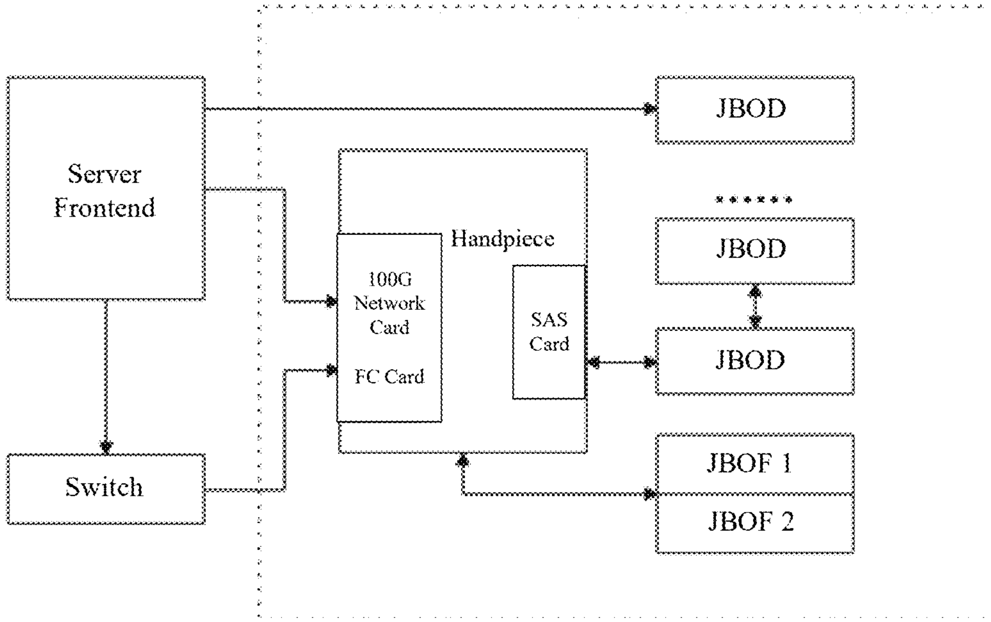
FIG. 4 is a schematic diagram of a cascade of a method for processing stored data according to an embodiment of the present disclosure.
Figure 5:
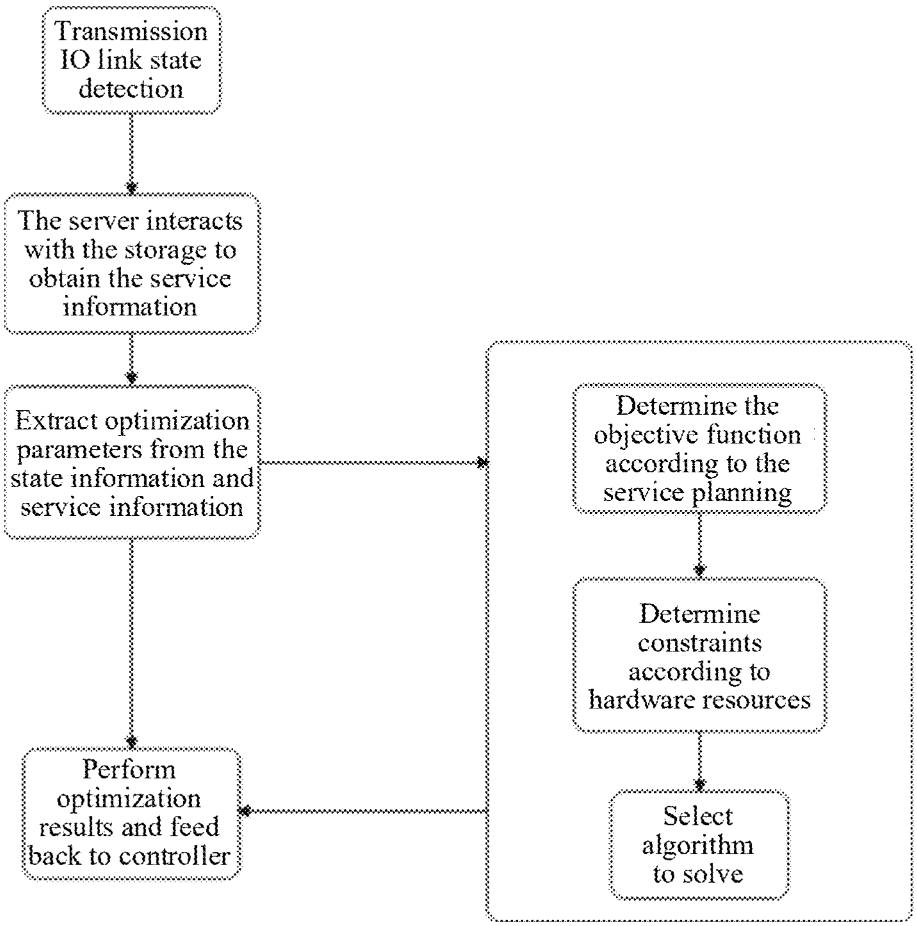
FIG. 5 is a schematic diagram of substeps of a method for processing stored data according to an embodiment of the present disclosure.

Referring to FIG. 3, FIG. 3 shows a flowchart of steps of a method for processing stored data of the present disclosure. The hardware expansion structure can refer to FIG. 4. Controllers are connected in pairs through non-transparent bridges (NTBs), one of the controllers connected in pairs is connected to a first switch, and the other of the controllers connected in pairs is connected to a second switch. This connection manner ensures that the switch leaves enough ports to connect to the frontend server, thereby ensuring the sharing of the data on the server. By using the topology transmission, especially for important service data, it is possible to achieve the RAID5 redundant design between the controllers from the server to the switch and then to a plurality of controllers, thereby enhancing the transmission security of important service data. The unified storage topology provided by the hardware is shown in FIG. 5. The data storage process includes three cascade structures, namely, "server-to-storage", "server-to-switch-to-storage" and "server-to-direct JBOD".

Figure 6:
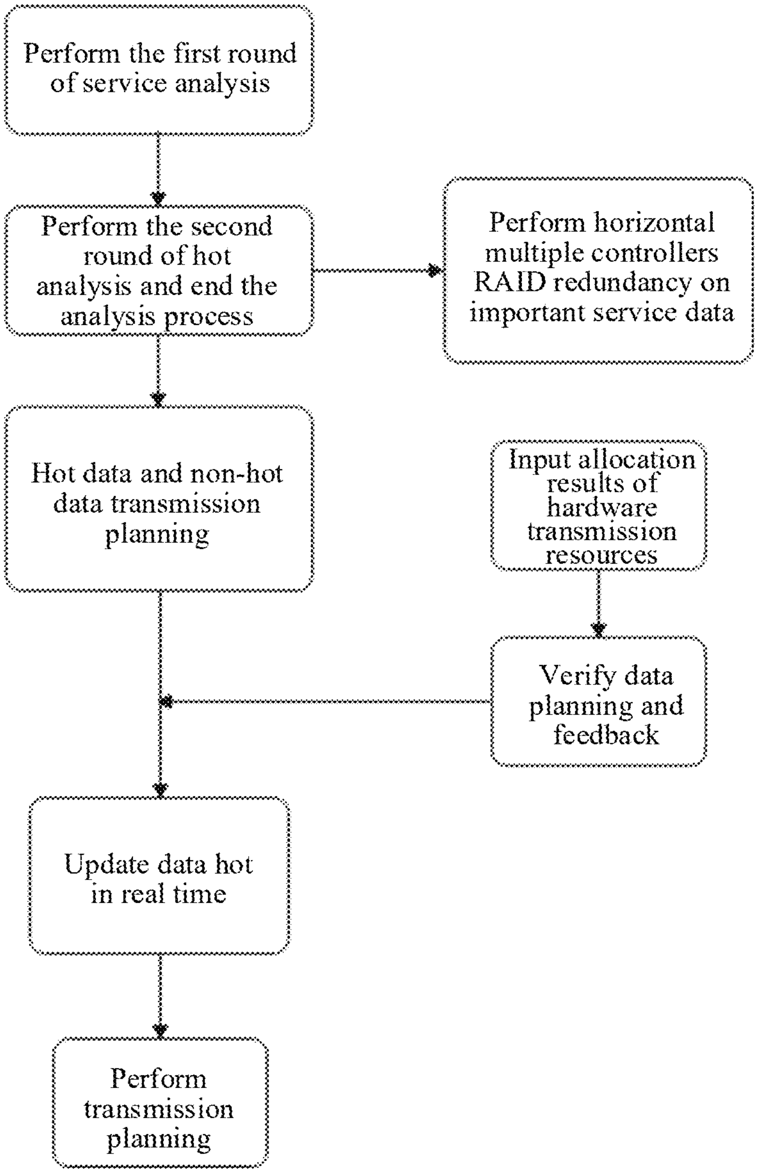
FIG. 6 is a schematic diagram of substeps of another method for processing stored data according to an embodiment of the present disclosure.

As shown in FIG. 6, rate parameters of the port are automatically detected, and then, the server interacts with the storage to determine the amount of data transmitted in this round. The server informs the storage controller of the total amount of data transmission in the three topologies of "server-to-storage", "server-to-switch-to-storage" and "server-to-direct JBOD" during this round of data transmission, and the controller and the server jointly determine the overall transmission planning shown in FIG. 7 according to the service to obtain the planned data transmission amount in the three topologies. The optimization objective of this round is to achieve the optimal allocation of data transmission hardware resources under the three transmission manners, thereby ensuring that the data input rate of the storage controller is equal to the data processing rate, the writing rate and the backup rate, and minimizing the delay.

Figure 7:
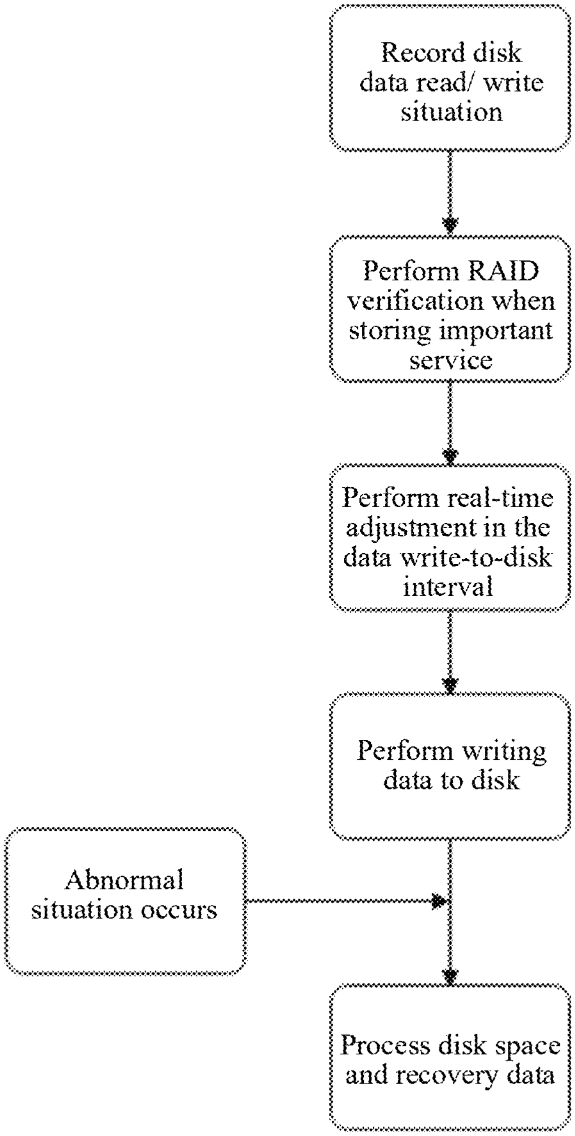
FIG. 7 is a schematic diagram of substeps of yet another method for processing stored data according to an embodiment of the present disclosure.

As shown in FIG. 7, the data transmission process will undergo two rounds of analysis. In the first round, analysis is performed based on the importance of service. The current service data includes three types of data such as financial data, hospital data and government affairs, and enjoys the highest priority, when the controller stores the above three types of data, the stored data is marked as important service data. For the important service data, a RAID5 array is formed among horizontal multiple controllers to provide sufficient redundancy, and the important service data is split and stored in just a bunch of flashes (JBOFs) on backends of a plurality of controllers. When an abnormality occurs in a controller and its cascaded expansion cabinet, data recovery is performed based on residual data and RAID verification information. In the second round, analysis is performed according to the data hot degree, the high hot data is data that has been read and written by the controller for many times, or also data that has been accessed by users for many times. The data is mainly related to the Internet and database. In the process of processing the data by a central processing unit (CPU), the server will feed back user access traffic to the storage in real time, meanwhile, reading and writing times of the data on the disk side will be recorded and fed back, and corresponding hot data will be extracted according to the above information. Hot data and non-hot data are stored in different manners and refreshed in real time. The data with the largest access traffic in the currently processed data is extracted from JBOF to the memory to support fast access. For the non-hot data in the important data, in order to avoid the delay during accidental access by the users, the present disclosure provides a data association design in the algorithm. When a part of non-hot data is accessed, data associated with the part of non-hot data will also be extracted into the memory for fast reading. After the above planning process is completed, it will be provided to the controller to optimize the hardware resources under three topologies in the previous algorithm, and verification is performed on optimization results. In the verification process, the hardware transmission resources allocated by different types of data will be searched in turn from "important service+hot data" to "unimportant service+non-hot data", and the above resource allocation situations will be fed back to the server for customer needs. In the process of processing the service data, if real-time access traffic increases or the access traffic decreases, or some important service data increases significantly, the controller does not need to re-optimize the hardware resource allocation algorithm again, but increases or decreases the corresponding hardware resources in real time according to the current verification situation, for example, switching more SAS links of non-important service data to important service data in a short time to maintain a dynamic balance of data transmission resources. This processing manner is fast and flexible.

Figure 8:
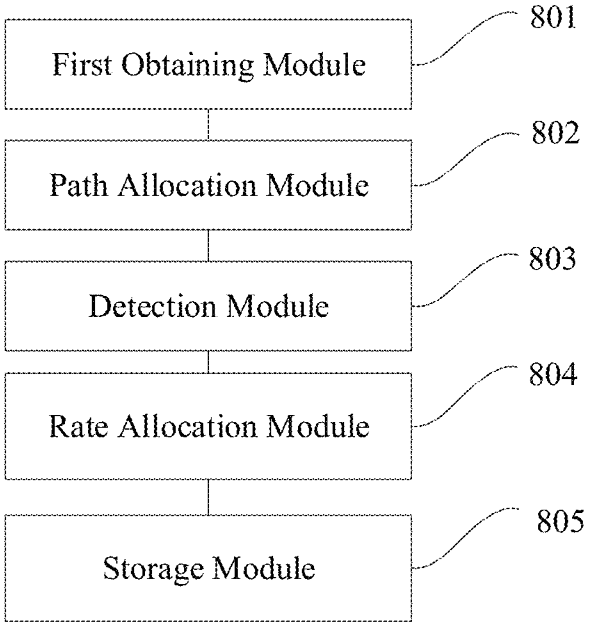
FIG. 8 is a structural block diagram of an apparatus for processing stored data according to an embodiment of the present disclosure.

As shown in FIG. 8, the above algorithm is improved on a data write-to-disk level. Before the data is written into the disk, the system will automatically allocate disk space for different types of service data, and after the data write-to-disk operation is completed, the storage interval will be updated in real time according to the storage situation of service data, so that the storage space with the large space remaining amount will be allocated to the storage space with the small space remaining amount for the next round of data storage. In the process of writing the data to the disk, the disk automatically records reading and writing situation of the data, the reading and writing frequency of the data is counted based on recording results, and high-frequency hot data is reported, if the hot data meets the standard, it will be extracted by the memory. After the reporting process is completed, the disk locates the stored important service data, and performs RAID5 verification on the important service data between disks within JBOD to ensure that data of one disk in the expansion cabinet may be completely recovered based on reserved data and verified data of other disks after the disk fails. When an abnormal state of a certain disk is detected, a service data storage partition where the disk is located will immediately remove the disk in a virtual space, and other disks in the space will share the data storage task of the abnormal disk in a short time. When the controller receives information about the abnormal state of the disk, the disk will be removed in the optimization process of the data transmission end. If the disk is responsible for storing the important service data, it is necessary to notify other controllers at the same time to complete the RAID5 data recovery task between controllers before the next round of data transmission.

It should be noted that for the sake of simple description, the method embodiments are all expressed as a series of action combinations. However, a person skilled in the art should know that these embodiments of the present disclosure are not limited by the order of the described actions, as certain steps can be performed in other orders or at the same time according to the embodiments of the present disclosure. Secondly, a person skilled in the art should also know that the embodiments described in the specification belong to some embodiments of the present disclosure, and the actions involved are not necessarily necessary for the embodiments of the present disclosure.

Referring to FIG. 8, FIG. 8 shows a structural block diagram of an apparatus for processing stored data according to an embodiment of the present disclosure. The stored data being transmitted in a storage topology, where the storage topology includes a server-to-storage cascade, a server-to-switch-to-storage cascade and a server-to-direct just a bunch of disks cascade. The apparatus for processing stored data can include following modules;

- a first obtaining module 801 configured to obtain service data, where the service data includes a service scenario and a total transmission amount;
- a path allocation module 802 configured to determine a storage path according to the service scenario, where the storage path includes a first storage sub-address corresponding to the server-to-storage cascade, a second storage sub-address corresponding to the server-to-switch-to-storage cascade and a third storage sub-address corresponding to the server-to-direct just a bunch of disks cascade;
- a detection module 803 configured to detect a real-time transmission rate of the storage topology;
- a rate allocation module 804 configured to divide the total transmission amount into a first transmission amount, a second transmission amount and a third transmission amount based on the real-time transmission rate, where the first transmission amount corresponds to the server-to-storage cascade, the second transmission amount corresponds to the server-to-switch-to-storage cascade and the third transmission amount corresponds to the server-to-direct just a bunch of disks cascade; and
- a storage module 805 configured to store the first transmission amount based on the first storage sub-address, store the second transmission amount based on the second storage sub-address, and store the third transmission amount based on the third storage sub-address.

In an embodiment of the present disclosure, the apparatus further includes:

- a recording module configured to record a first storage state of the server-to-storage cascade, a second storage state of the server-to-switch-to-storage cascade and a third storage state of the server-to-direct just a bunch of disks cascade; and
- a storage interval adjustment module configured to adjust a storage interval of the server-to-storage cascade based on the first storage state, adjust a storage interval of the server-to-switch-to-storage cascade based on the second storage state, and adjust a storage interval of the server-to-direct just a bunch of disks cascade based on the third storage state.

In an embodiment of the present disclosure, the apparatus further includes:

- a determination module configured to determine whether the service scenario is a target scenario; and
- a verification module configured to verify data stored in the server-to-direct just a bunch of disks cascade in response to the service scenario being the target scenario.

In an embodiment of the present disclosure, the apparatus further includes:

- a recovery module configured to perform data recovery on the server-to-direct just a bunch of disks cascade in response to a failure of the verifying the data stored in the server-to-direct just a bunch of disks cascade.

In an embodiment of the present disclosure, the apparatus further includes:

an initial detection module configured to detect a first link state of the server-to-storage cascade, a second link state of the server-to-switch-to-storage cascade and a third link state of the server-to-direct just a bunch of disks cascade during initialization; and an execution module configured to perform the step of detecting the real-time transmission rate of the storage topology in response to the first link state being a normal state, the second link state being a normal state and the third link state being a normal state.

In an embodiment of the present disclosure, the apparatus further includes:

a first state detection module configured to detect whether the first link state is the normal state, whether the second link state is the normal state and whether the third link state is the normal state;

a second failure determination module configured to determine a first failed disk corresponding to the server-to-storage cascade in response to the first link state being an abnormal state;

a third failure determination module configured to determine a second failed disk corresponding to the server-to-switch-to-storage cascade in response to the second link state being an abnormal state;

a fourth failure determination module configured to determine a third failed disk corresponding to server-to-direct just a bunch of disks cascade in response to the third link state being an abnormal state; and a removal module configured to remove at least one of the first failed disk, the second failed disk or the third failed disk.

In an embodiment of the present disclosure, the real-time transmission rate includes a real-time input rate and a real-time output rate, and the rate allocation module 804 includes:

a calculation submodule configured to calculate a rate difference between the real-time input rate and the real-time output rate; and a dividing submodule configured to divide the total transmission amount into the first transmission amount, the second transmission amount and the third transmission amount according to the rate difference.

In an embodiment of the present disclosure, the real-time input rate includes a first input rate corresponding to the server-to-storage cascade, a second input rate corresponding to the server-to-switch-to-storage cascade and a third input rate corresponding to the server-to-direct just a bunch of disks cascade, the real-time output rate includes a first output rate corresponding to the server-to-storage cascade, a second output rate corresponding to the server-to-switch-to-storage cascade and a third output rate corresponding to the server-to-direct just a bunch of disks cascade, and the calculation submodule includes:

a first calculation unit configured to calculate a first difference between the first input rate and the first output rate;

a second calculation unit configured to calculate a second difference between the second input rate and the second output rate;

a third calculation unit configured to calculate a third difference between the third input rate and the third output rate; and a rate difference determination unit configured to determine the rate difference according to the first difference, the second difference and the third difference.

In an embodiment of the present disclosure, the rate difference determination unit includes:

a sorting subunit configured to sort the first difference, the second difference and the third difference in increasing order to generate a set of differences; and a rate difference determination subunit configured to determine a difference at a first position in the set of differences as the rate difference.

In an embodiment of the present disclosure, the dividing submodule includes:

a first transmission sub-rate adjustment unit configured to adjust the first input rate and the first output rate according to the rate difference to obtain a first transmission sub-rate;

a second transmission sub-rate adjustment unit configured to adjust the second input rate and the second output rate according to the rate difference to obtain a second transmission sub-rate;

a third transmission sub-rate adjustment unit configured to adjust the third input rate and the third output rate according to the rate difference to obtain a third transmission sub-rate; and a dividing unit configured to divide the total transmission amount into the first transmission amount, the second transmission amount and the third transmission amount according to the first transmission sub-rate, the second transmission sub-rate and the third transmission sub-rate.

In an embodiment of the present disclosure, the dividing unit includes:

a first dividing subunit configured to divide the total transmission amount by a first transmission sub-rate to obtain a first transmission amount;

a second dividing subunit configured to divide the total transmission amount by a second transmission sub-rate to obtain a second transmission amount;

a third dividing subunit configured to divide the total transmission amount by a third transmission sub-rate to obtain a third transmission amount.

In an embodiment of the present disclosure, the service scenario includes a service type and data heat, and the path allocation module 802 includes:

a first planning submodule configured to perform path planning based on the service type to obtain a first initial path;

a second planning submodule configured to perform path planning based on the data heat to obtain a second initial path; and a path planning module configured to generate the storage path by combining the first initial path and the second initial path.

In an embodiment of the present disclosure, the path allocation module 802 includes:

a redundant submodule configured to perform redundant settings on the storage path in response to the service type being a preset service type.

In an embodiment of the present disclosure, the first planning submodule includes:

a priority determination unit configured to determine a storage priority according to the service type; and a first planning unit configured to perform the path planning based on the storage priority to obtain the first initial path.

In an embodiment of the present disclosure, the first planning unit includes:

a query subunit configured to query a disk path corresponding to the storage priority; and a first initial path determination subunit configured to determine the disk path as the first initial path.

In an embodiment of the present disclosure, the second planning submodule includes:

a second sorting unit configured to perform descending sorting according to the data heat to generate a heat order; and a second planning unit configured to perform the path planning according to the heat order to obtain the second initial path.

In an embodiment of the present disclosure, the second planning unit includes:

a heat order subunit configured to determine a reading frequency path corresponding to the heat order; and a second initial path determination subunit configured to determine the reading frequency path as the second initial path.

The apparatus embodiments are substantially similar to the method embodiments, and thus the description is relatively simple, and the relevant points can be found in part of the description of the method embodiments.

Figure 9:
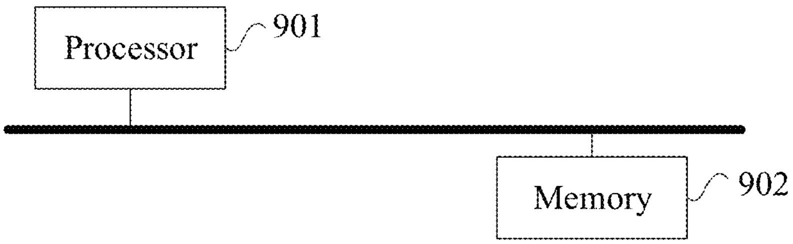
FIG. 9 is a structural block diagram of an electronic device according to an embodiment of the present disclosure.

Referring to FIG. 9, an embodiment of the present disclosure further provides an electronic device, including:

a processor 901 and a memory 902, where the memory 902 stores a computer program executable by the processor 901, and when the electronic device is running, the processor 901 executes the computer program to perform the method for processing stored data according to any one of the embodiments of the present disclosure. The specific implementation and technical effects are similar to those of the method embodiments, and will not be described here.

The memory can include random access memory (RAM) or non-volatile memory, for example, at least one disk memory. Alternatively, the memory can also be at least one storage apparatus located away from the aforementioned processor.

The above processor can be a general purpose processor, including a central processing unit (CPU), a network processor (NP), and the like, or can also be a digital signal processing (DSP), an application specific integrated circuit (ASIC), a field-programmable gate array (FPGA) or other programmable logic devices, discrete gate or transistor logic devices, and discrete hardware components.

Figure 10:
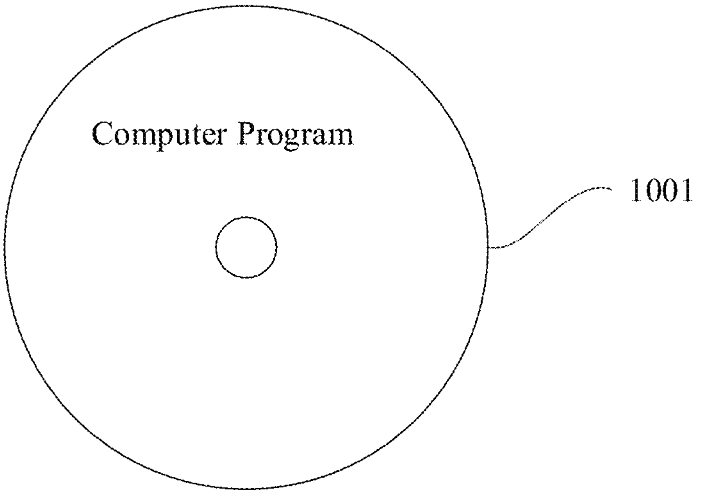
FIG. 10 is a structural block diagram of a non-transitory storage medium according to an embodiment of the present disclosure.

Referring to FIG. 10, an embodiment of the present disclosure further provides a non-transitory readable storage medium 1001 storing a computer program, where the computer program, when executed by a processor, cases the processor to perform the method for processing stored data according to any one of the embodiments of the present disclosure. The specific implementation and technical effects are similar to those of the method embodiments, and will not be described here.

The various embodiments in the present disclosure are described in a progressive manner. Each embodiment focus on differences from other embodiments. The same or similar parts between the various embodiments can be referred to each other.

A person skilled in the art should understand that the embodiments of the present disclosure can be provided as methods, apparatus, or computer program products. Therefore, the embodiments of the present disclosure can take the form of an entirely hardware embodiment, an entirely software embodiment, or an embodiment combining software and hardware. Moreover, the embodiments of the present disclosure can take the form of a computer program product embodied on one or more computer usable storage medium (including but not limited to disk storage, CD-ROM, optical storage, and the like) containing computer usable program codes.

The embodiments of the present disclosure are described with reference to flowcharts and/or block diagrams of methods, terminal devices (systems), and computer program products according to the embodiments of the present disclosure. It should be understood that each flow and/or block of the flowcharts and/or block diagrams and a combination of flows and/or blocks of the flowcharts and/or block diagrams can be implemented by computer program instructions. These computer program instructions can be provided to a processor of a general purpose computer, a special purpose computer, an embedded processor, or other programmable data processing terminal devices to produce a machine, so that instructions are executed by the processor of the computer or other programmable data processing terminal devices to produce means for implementing the functions specified in one or more flows in the flowchart and/or one or more blocks in the block diagram.

These computer program instructions can also be stored in a computer readable memory that can direct a computer or other programmable data processing terminal devices to operate in a particular manner, so that the instructions stored in the computer readable memory produce a manufacture that includes instruction apparatuses. The instruction apparatuses implement the functions specified in one or more flows in the flowchart and/or one or more blocks in the block diagram.

These computer program instructions can also be loaded onto a computer or other programmable data processing terminal devices, so that a series of operational steps are performed on the computer or other programmable terminal devices to produce computer implemented processing. The instructions executed on the computer or other programmable terminal devices provide steps for implementing the functions specified in one or more flows in the flowchart and/or one or more blocks in the block diagram.

Although the embodiments of the present disclosure have been described, a person skilled in the art can make additional changes and modifications to these embodiments once they are aware of the basic inventive concept. Therefore, the appended claims are intended to be interpreted as including the embodiments and all changes and modifications that fall within the scope of the embodiments of the present disclosure.

Finally, it should also be noted that in the present disclosure, relational terms such as "first" and "second" are only used to distinguish one entity or operation from another entity or operation, and do not necessarily require or imply any such actual relationship or order between these entities or operations. Moreover, the terms "comprises", "comprising" or any other variations are intended to encompass a non-exclusive inclusion, so that processes, methods, articles, or terminal devices that include a plurality of elements include not only those elements but also other elements that are not explicitly listed, or elements inherent to such processes, methods, articles, or terminal devices. Without further limitation, an element defined by the phrase "comprising a . . . " does not exclude the presence of additional identical elements in the processes, methods, articles, or terminal devices that include the element.

The method and apparatus for processing stored data, the electronic device and the non-transitory storage medium provided by the present disclosure are described in detail as above. The principles and embodiments of the present disclosure are described with the specific examples. The descriptions of the above embodiments are only for helping to understand the method and core ideas of the present disclosure. At the same time, for a person of ordinary skill in the art, according to the ideas of the present disclosure, there may be changes in specific embodiments and application scopes. In summary, contents of the specification should not be understood as limiting the present disclosure.

The invention claimed is:

1. A method for processing stored data, the stored data being transmitted in a storage topology, wherein the storage topology comprises a server-to-storage cascade, a server-to-switch-to-storage cascade and a server-to-direct just a bunch of disks cascade, and the method comprises:

obtaining service data, wherein the service data comprises a service scenario and a total transmission amount;

determining a storage path according to the service scenario, wherein the storage path comprises a first storage sub-address corresponding to the server-to-storage cascade, a second storage sub-address corresponding to the server-to-switch-to-storage cascade and a third storage sub-address corresponding to the server-to-direct just a bunch of disks cascade;

detecting a real-time transmission rate of the storage topology;

dividing the total transmission amount into a first transmission amount, a second transmission amount and a third transmission amount based on the real-time transmission rate, wherein the first transmission amount corresponds to the server-to-storage cascade, the second transmission amount corresponds to the server-to-switch-to-storage cascade and the third transmission amount corresponds to the server-to-direct just a bunch of disks cascade; and storing the first transmission amount based on the first storage sub-address, storing the second transmission amount based on the second storage sub-address, and storing the third transmission amount based on the third storage sub-address.

2. The method according to claim 1, wherein after the step of storing the first transmission amount based on the first storage sub-address, storing the second transmission amount based on the second storage sub-address, and storing the third transmission amount based on the third storage sub-address, the method further comprises:

recording a first storage state of the server-to-storage cascade, a second storage state of the server-to-switch-to-storage cascade and a third storage state of the server-to-direct just a bunch of disks cascade; and adjusting a storage interval of the server-to-storage cascade based on the first storage state, adjusting a storage interval of the server-to-switch-to-storage cascade based on the second storage state, and adjusting a storage interval of the server-to-direct just a bunch of disks cascade based on the third storage state.

3. The method according to claim 1, wherein after the step of storing the first transmission amount based on the first storage sub-address, storing the second transmission amount based on the second storage sub-address, and storing the third transmission amount based on the third storage sub-address, the method further comprises:

determining whether the service scenario is a target scenario; and verifying data stored in the server-to-direct just a bunch of disks cascade in response to the service scenario being the target scenario.

4. The method according to claim 3, wherein after the step of verifying the data stored in the server-to-direct just a bunch of disks cascade, the method further comprises:

performing data recovery on the server-to-direct just a bunch of disks cascade in response to a failure of the verifying the data stored in the server-to-direct just a bunch of disks cascade.

5. The method according to claim 1, wherein the method further comprises:

detecting a first link state of the server-to-storage cascade, a second link state of the server-to-switch-to-storage cascade and a third link state of the server-to-direct just a bunch of disks cascade during initialization; and performing the step of detecting the real-time transmission rate of the storage topology in response to the first link state being a normal state, the second link state being a normal state and the third link state being a normal state.

6. The method according to claim 5, wherein after the step of storing the first transmission amount based on the first storage sub-address, storing the second transmission amount based on the second storage sub-address, and storing the third transmission amount based on the third storage sub-address, the method further comprises:

detecting whether the first link state is the normal state, whether the second link state is the normal state and whether the third link state is the normal state;

determining a first failed disk corresponding to the server-to-storage cascade in response to the first link state being an abnormal state;

determining a second failed disk corresponding to the server-to-switch-to-storage cascade in response to the second link state being an abnormal state;

determining a third failed disk corresponding to server-to-direct just a bunch of disks cascade in response to the third link state being an abnormal state; and removing at least one of the first failed disk, the second failed disk or the third failed disk.

7. The method according to claim 1, wherein the real-time transmission rate comprises a real-time input rate and a real-time output rate, and the step of dividing the total transmission amount into the first transmission amount, the second transmission amount and the third transmission amount based on the real-time transmission rate comprises:

calculating a rate difference between the real-time input rate and the real-time output rate; and dividing the total transmission amount into the first transmission amount, the second transmission amount and the third transmission amount according to the rate difference.

8. The method according to claim 7, wherein the real-time input rate comprises a first input rate corresponding to the server-to-storage cascade, a second input rate corresponding to the server-to-switch-to-storage cascade and a third input rate corresponding to the server-to-direct just a bunch of disks cascade, the real-time output rate comprises a first output rate corresponding to the server-to-storage cascade, a second output rate corresponding to the server-to-switch-to-storage cascade and a third output rate corresponding to the server-to-direct just a bunch of disks cascade, and the step of calculating the rate difference between the real-time input rate and the real-time output rate comprises:

calculating a first difference between the first input rate and the first output rate;

calculating a second difference between the second input rate and the second output rate;

calculating a third difference between the third input rate and the third output rate; and determining the rate difference according to the first difference, the second difference and the third difference.

9. The method according to claim 8, wherein the step of determining the rate difference according to the first difference, the second difference and the third difference comprises:

sorting the first difference, the second difference and the third difference in increasing order to generate a set of differences; and determining a difference at a first position in the set of differences as the rate difference.

10. The method according to claim 8, wherein the step of dividing the total transmission amount into the first transmission amount, the second transmission amount and the third transmission amount according to the rate difference comprises:

adjusting the first input rate and the first output rate according to the rate difference to obtain a first transmission sub-rate;

adjusting the second input rate and the second output rate according to the rate difference to obtain a second transmission sub-rate;

adjusting the third input rate and the third output rate according to the rate difference to obtain a third transmission sub-rate; and dividing the total transmission amount into the first transmission amount, the second transmission amount and the third transmission amount according to the first transmission sub-rate, the second transmission sub-rate and the third transmission sub-rate.

11. The method according to claim 10, wherein the step of dividing the total transmission amount into the first transmission amount, the second transmission amount and the third transmission amount according to the first transmission sub-rate, the second transmission sub-rate and the third transmission sub-rate comprises:

dividing the total transmission amount by the first transmission sub-rate to obtain a first transmission amount;

dividing the total transmission amount by the second transmission sub-rate to obtain a second transmission amount; and dividing the total transmission amount by the third transmission sub-rate to obtain a third transmission amount.

12. The method according to claim 1, wherein the service scenario comprises a service type and data heat, and the step of determining the storage path according to the service scenario comprises:

performing path planning based on the service type to obtain a first initial path;

performing path planning based on the data heat to obtain a second initial path; and generating the storage path by combining the first initial path and the second initial path.

13. The method according to claim 12, wherein the step of determining the storage path according to the service scenario further comprises:

performing redundant settings on the storage path in response to the service type being a preset service type.

14. The method according to claim 12, wherein the step of performing the path planning based on the service type to obtain the first initial path comprises:

determining a storage priority according to the service type; and performing the path planning based on the storage priority to obtain the first initial path.

15. The method according to claim 14, wherein the step of performing the path planning based on the storage priority to obtain the first initial path comprises:

querying a disk path corresponding to the storage priority; and determining the disk path as the first initial path.

16. The method according to claim 12, wherein the step of performing the path planning based on the data heat to obtain the second initial path comprises:

performing descending sorting according to the data heat to generate a heat order; and performing the path planning according to the heat order to obtain the second initial path.

17. The method according to claim 16, wherein the step of performing the path planning according to the heat order to obtain the second initial path comprises:

determining a reading frequency path corresponding to the heat order; and determining the reading frequency path as the second initial path.

18. An electronic device, comprising: a processor, a memory and a computer program stored in the memory and capable of running on the processor, wherein the computer program, when executed by the processor, cases the processor to implement a method for processing stored data, wherein the stored data is transmitted in a storage topology, the storage topology comprises a server-to-storage cascade, a server-to-switch-to-storage cascade and a server-to-direct just a bunch of disks cascade, and the method comprises:

obtaining service data, wherein the service data comprises a service scenario and a total transmission amount;

determining a storage path according to the service scenario, wherein the storage path comprises a first storage sub-address corresponding to the server-to-storage cascade, a second storage sub-address corresponding to the server-to-switch-to-storage cascade and a third storage sub-address corresponding to the server-to-direct just a bunch of disks cascade;

detecting a real-time transmission rate of the storage topology;

dividing the total transmission amount into a first transmission amount, a second transmission amount and a third transmission amount based on the real-time transmission rate, wherein the first transmission amount corresponds to the server-to-storage cascade, the second transmission amount corresponds to the server-to-switch-to-storage cascade and the third transmission amount corresponds to the server-to-direct just a bunch of disks cascade; and storing the first transmission amount based on the first storage sub-address, storing the second transmission amount based on the second storage sub-address, and storing the third transmission amount based on the third storage sub-address.

19. The electronic device according to claim 18, wherein the processor is further configured to implement the method comprising:

recording a first storage state of the server-to-storage cascade, a second storage state of the server-to-switch-to-storage cascade and a third storage state of the server-to-direct just a bunch of disks cascade; and adjusting a storage interval of the server-to-storage cascade based on the first storage state, adjusting a storage interval of the server-to-switch-to-storage cascade based on the second storage state, and adjusting a storage interval of the server-to-direct just a bunch of disks cascade based on the third storage state.

20. A non-transitory readable storage medium storing a computer program, wherein the computer program, when executed by a processor, cases the processor to perform a method for processing stored data, wherein the stored data is transmitted in a storage topology, the storage topology comprises a server-to-storage cascade, a server-to-switch-to-storage cascade and a server-to-direct just a bunch of disks cascade, and the method comprises:

obtaining service data, wherein the service data comprises a service scenario and a total transmission amount;

determining a storage path according to the service scenario, wherein the storage path comprises a first storage sub-address corresponding to the server-to-storage cascade, a second storage sub-address corresponding to the server-to-switch-to-storage cascade and a third storage sub-address corresponding to the server-to-direct just a bunch of disks cascade;

detecting a real-time transmission rate of the storage topology;

dividing the total transmission amount into a first transmission amount, a second transmission amount and a third transmission amount based on the real-time transmission rate, wherein the first transmission amount corresponds to the server-to-storage cascade, the second transmission amount corresponds to the server-to-switch-to-storage cascade and the third transmission amount corresponds to the server-to-direct just a bunch of disks cascade; and storing the first transmission amount based on the first storage sub-address, storing the second transmission amount based on the second storage sub-address, and storing the third transmission amount based on the third storage sub-address.

* * * * *